United States Patent
Dai et al.

(10) Patent No.: US 11,260,540 B2
(45) Date of Patent: Mar. 1, 2022

(54) AUTOMATIC PICK-UP EQUIPMENT

(71) Applicants: Tyco Electronics (Shanghai) Co. Ltd., Shanghai (CN); Shenzhen AMI Technology Co., Ltd., Shenzhen (CN)

(72) Inventors: Zhiyong Dai, Shanghai (CN); Lvhai Hu, Shanghai (CN); Yingcong Deng, Shanghai (CN); Qinglong Zeng, Shenzhen (CN); Wei Kang, Shenzhen (CN)

(73) Assignees: Tyco Electronics (Shanghai) Co. Ltd., Shanghai (CN); Shenzhen AMI Technology Co. Ltd., Shenzhen (CN)

( * ) Notice: Subject to any disclaimer, the term of this patent is extended or adjusted under 35 U.S.C. 154(b) by 192 days.

(21) Appl. No.: 16/587,192

(22) Filed: Sep. 30, 2019

(65) Prior Publication Data
US 2020/0023526 A1    Jan. 23, 2020

Related U.S. Application Data

(63) Continuation of application No. PCT/EP2018/058321, filed on Mar. 30, 2018.

(30) Foreign Application Priority Data

Mar. 30, 2017   (CN) .......................... 201710204608.X

(51) Int. Cl.
*B25J 15/00*  (2006.01)
*B25J 15/02*  (2006.01)

(52) U.S. Cl.
CPC ....... *B25J 15/0057* (2013.01); *B25J 15/0061* (2013.01); *B25J 15/026* (2013.01); *B25J 15/0226* (2013.01)

(58) Field of Classification Search
CPC ................ B25J 15/0052; B25J 15/0057; B25J 15/0061; B25J 15/0226; B25J 15/026
(Continued)

(56) References Cited

U.S. PATENT DOCUMENTS 4,655,676 A * 4/1987 Jannborg ............... B25J 9/0093
                                                           414/736
5,974,643 A * 11/1999 Hays .................. B23Q 17/2233
                                                            29/39
(Continued)

FOREIGN PATENT DOCUMENTS

DE    2505627       8/1976
EP    2364824 A1    9/2011
(Continued)

OTHER PUBLICATIONS

PCT Notification, The International Search Report and the Written Opinion of the International Searching Authority, dated Jul. 6, 2018, 16 pages.
(Continued)

*Primary Examiner* — Dean J Kramer
(74) *Attorney, Agent, or Firm* — Barley Snyder

(57) ABSTRACT

An automatic pick-up equipment adapted to pick up components having different shapes includes a base mounted on a manipulator of a robot, a first pick-up device mounted on the base and including a pair of first gripping mechanisms opposite to each other, and a second pick-up device mounted on the base and including a pair of second gripping mechanisms opposite to each other and a rotation mechanism. The first gripping mechanisms are configured to linearly reciprocate relative to each other to grip a first component. The second gripping mechanisms are configured to pivotally reciprocate relative to each other to grip a second component. The rotation mechanism is configured to drive the
(Continued)

second gripping mechanisms to rotate relative to the base to change a posture of the second component.

19 Claims, 10 Drawing Sheets

(58) Field of Classification Search
USPC .......................................................... 294/2
See application file for complete search history.

(56) References Cited

U.S. PATENT DOCUMENTS

| | | | |
|---|---|---|---|
| 6,722,842 B1* | 4/2004 | Sawdon | B23K 37/0452 414/729 |
| 8,025,277 B2* | 9/2011 | Lin | B25J 15/0052 269/55 |
| 8,408,616 B2* | 4/2013 | Yeum | B25J 15/0052 294/86.4 |
| 8,418,341 B1* | 4/2013 | Fisher | B25J 15/0061 29/443 |
| 9,802,325 B2* | 10/2017 | Houser | B29C 33/20 |
| 2017/0057025 A1* | 3/2017 | Dai | B23P 19/04 |

FOREIGN PATENT DOCUMENTS

| | | |
|---|---|---|
| GB | 1461432 | 1/1977 |
| JP | 59-151687 U | 10/1984 |
| JP | 60-250402 A | 12/1985 |
| JP | 6-143173 A | 5/1994 |

OTHER PUBLICATIONS

Abstract of JP 60-250402, dated Dec. 11, 1985, 1 page.
Abstract of JP 6-14173, dated May 24, 1994, 1 page.

* cited by examiner

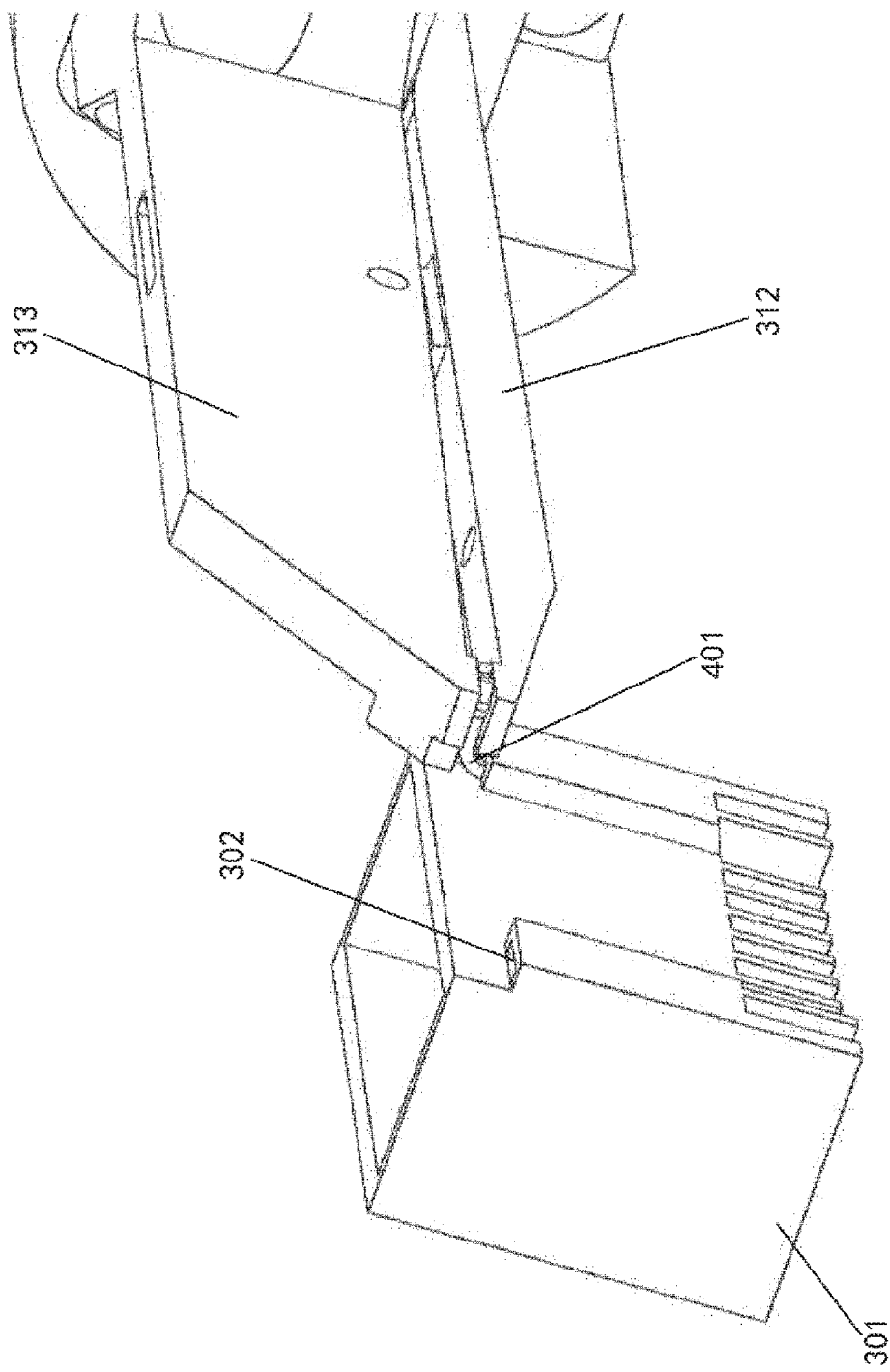

AUTOMATIC PICK-UP EQUIPMENT

CROSS-REFERENCE TO RELATED APPLICATIONS

This application is a continuation of PCT International Application No. PCT/EP2018/058321, filed on Mar. 30, 2018, which claims priority under 35 U.S.C. § 119 to Chinese Patent Application No. 201710204608.X, filed on Mar. 30, 2017.

FIELD OF THE INVENTION

The present invention relates to an automatic pick-up equipment and, more particularly, to an automatic pick-up equipment for picking up different components.

BACKGROUND

An electronic device, such as an electrical connector, a fiber optic connector, a relay, etc., includes many components, for example, a housing, a conductive terminal, a spring, a bolt, an insulation block, etc. During production of the electronic device, these components must be prepared with different shapes and functions in advance, selected according to a predefined program by manual or robotic operation, and assembled into the electronic device on an operation platform.

SUMMARY

An automatic pick-up equipment adapted to pick up components having different shapes includes a base mounted on a manipulator of a robot, a first pick-up device mounted on the base and including a pair of first gripping mechanisms opposite to each other, and a second pick-up device mounted on the base and including a pair of second gripping mechanisms opposite to each other and a rotation mechanism. The first gripping mechanisms are configured to linearly reciprocate relative to each other to grip a first component. The second gripping mechanisms are configured to pivotally reciprocate relative to each other to grip a second component. The rotation mechanism is configured to drive the second gripping mechanisms to rotate relative to the base to change a posture of the second component.

BRIEF DESCRIPTION OF THE DRAWINGS

The invention will now be described by way of example with reference to the accompanying Figures, of which:

FIG. 10 is a perspective view of the connection terminal mounted on the housing with the second pick-up device.

DETAILED DESCRIPTION OF THE EMBODIMENT(S)

Figure 1:
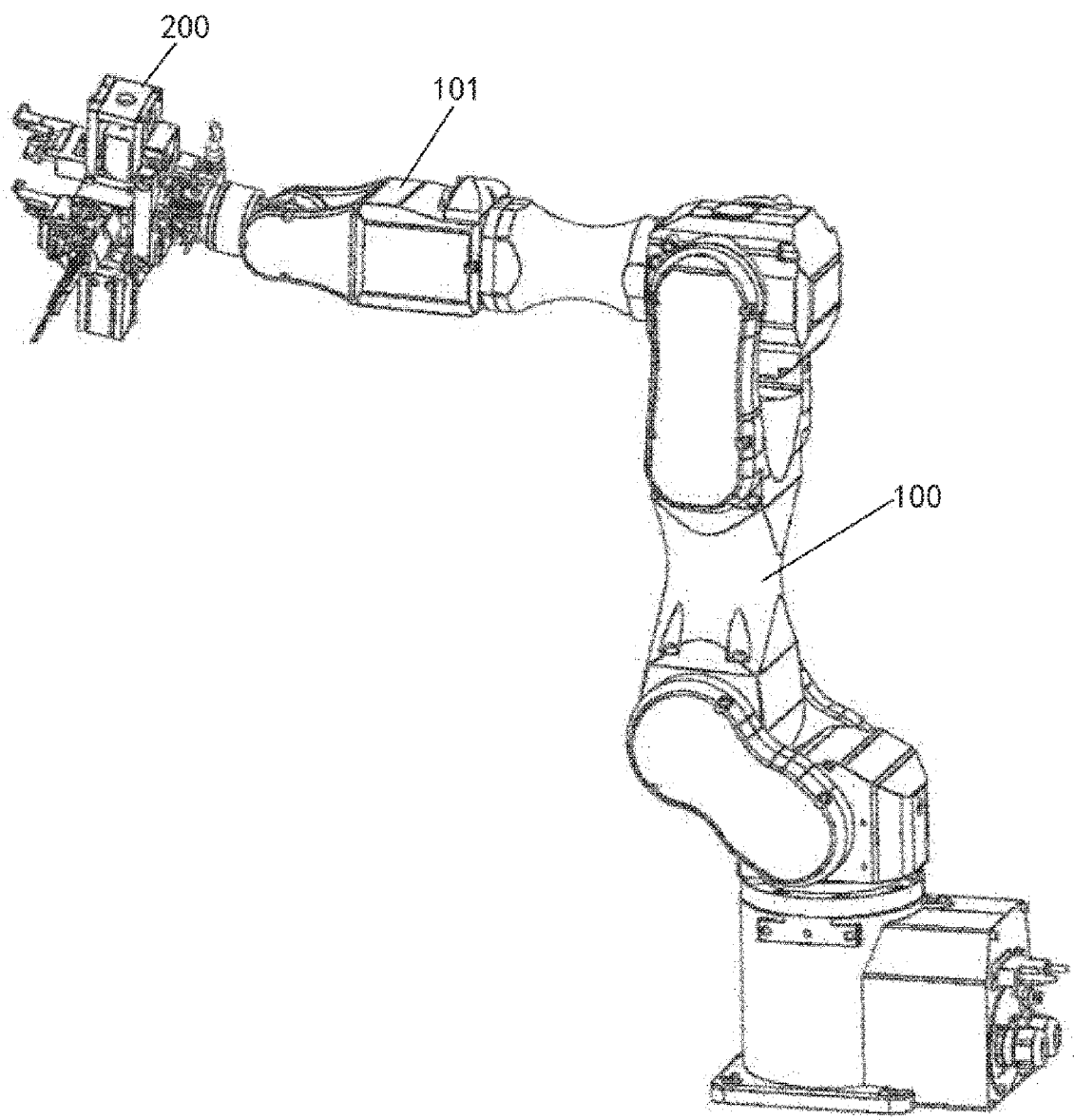
FIG. 1 is a perspective view of an automatic pick-up equipment according to an embodiment mounted on a robot.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An automatic pick-up equipment 200 according to an embodiment, as shown in FIG. 1, is configured to pick up various components with different shapes. In an embodiment, these components, used as operation objects, are adapted to be assembled into an electronic device, such as an electrical connector, a fiber optic connector, a relay, etc. in subsequent operations. These components may include but are not limited to housings, conductive terminals, springs, bolts, insulation blocks, wires, etc. mixed together. It should be appreciated that these different types of components may have different shapes, sizes, flexibilities and functions. In an embodiment, as shown in FIGS. 2 and 3, these components include a first component 300, such as a housing, an insulation body, etc. of an electrical connector, with a larger external size, and a second component 400, such as a connection terminal, a wire, a bolt, etc. of the electrical connector, with a smaller thickness.

The automatic pick-up equipment, as shown in FIGS. 1-4, comprises a base 1, a first pick-up device 2 and a second pick-up device 3. The base 1 is detachably mounted on a manipulator 101 of a robot 100. The manipulator 101 may perform a rotating operation, a rising operation, a dropping operation, etc., according to a stored program, to transport the automatic pick-up device 200 to an operation position.

Figure 2:
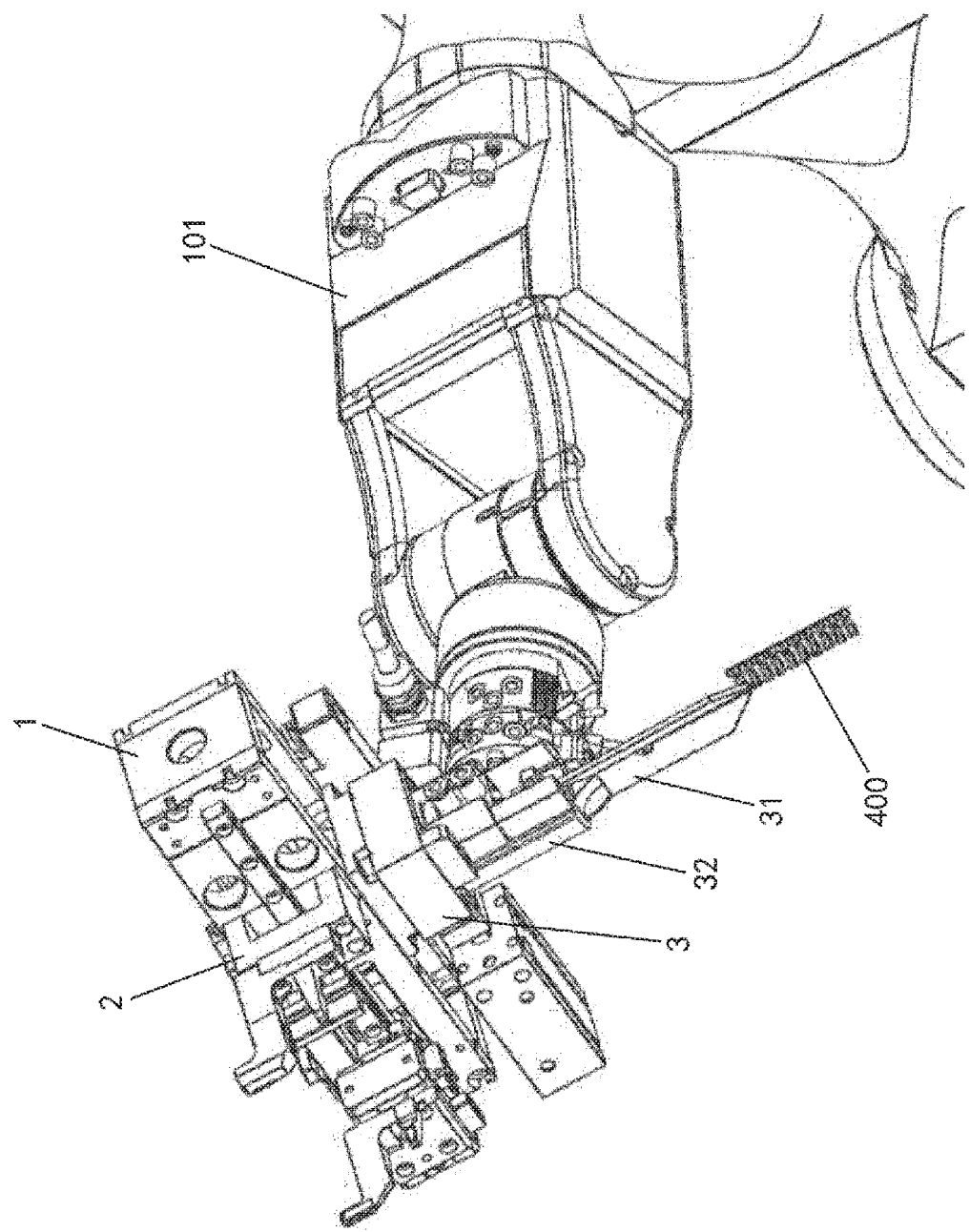
FIG. 2 is a perspective view of the automatic pick-up equipment and a manipulator of the robot.
Figure 3:
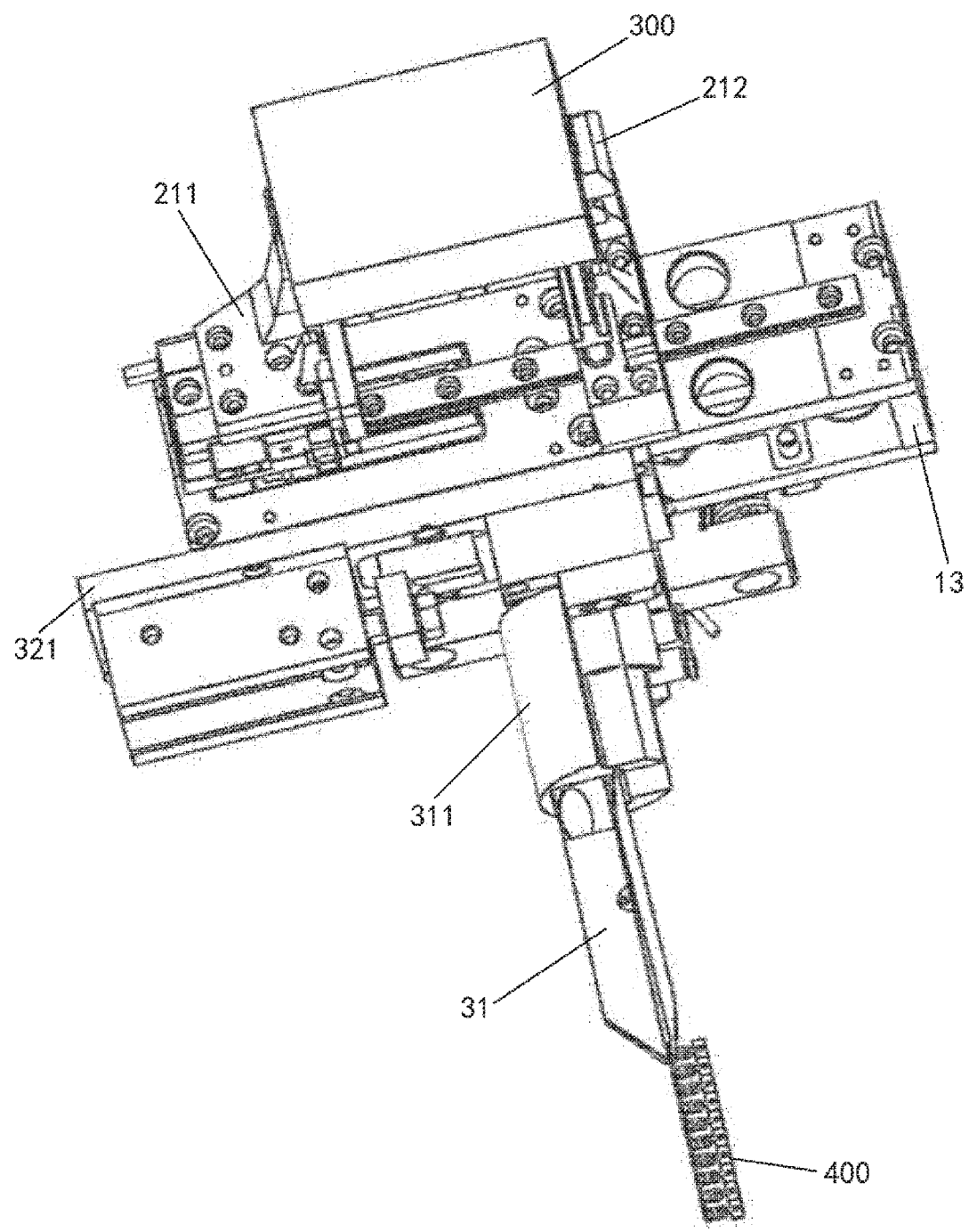
FIG. 3 is a perspective view of the automatic pick-up equipment with a first component and a second component.
Figure 4:
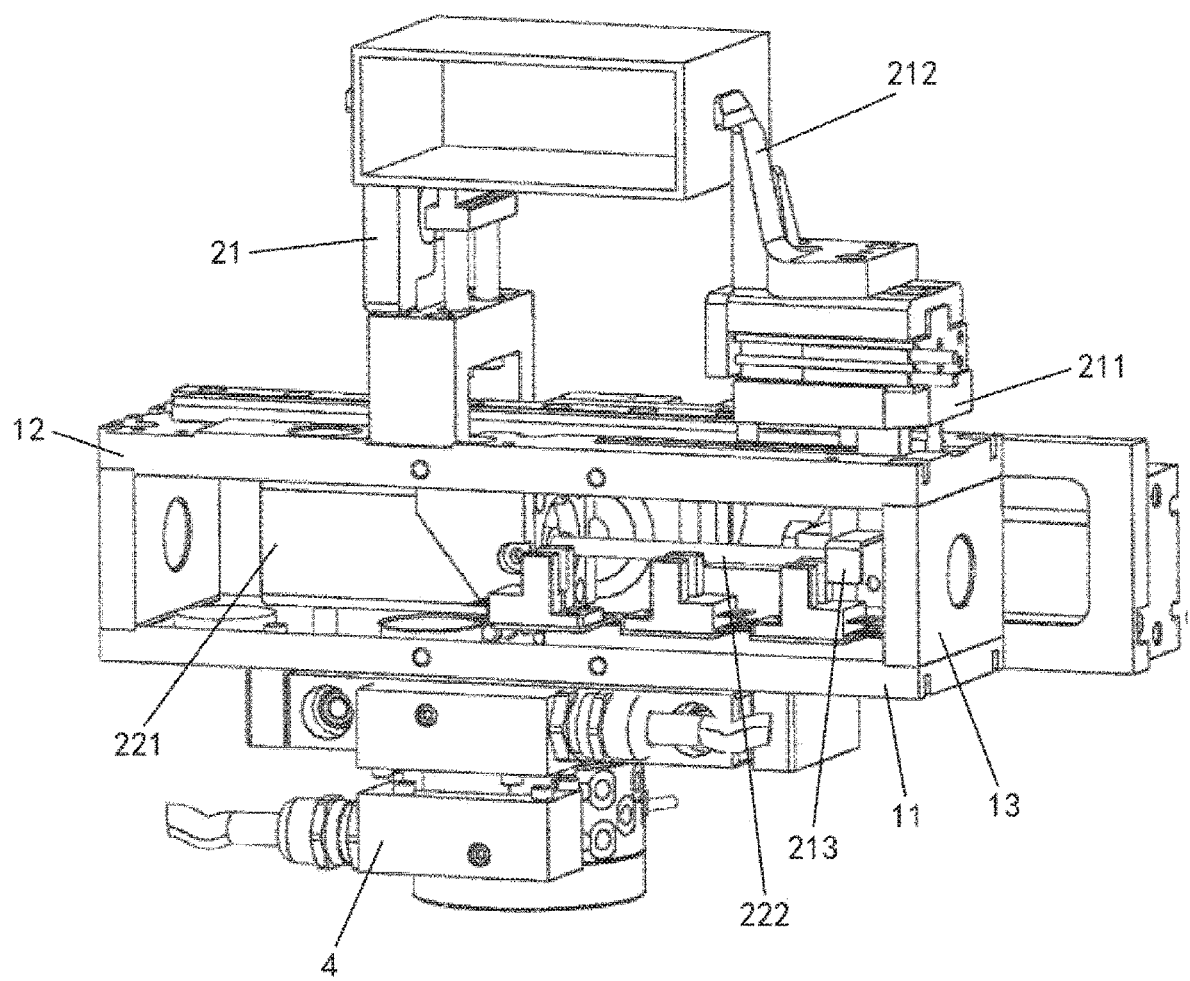
FIG. 4 is a perspective view of the automatic pick-up equipment.

The first pick-up device 2, as shown in FIGS. 2-4, is mounted on the base 1 and comprises two first gripping mechanisms 21 opposite to each other, the two first gripping mechanisms 21 being configured to linearly reciprocate relative to each other, so as to grip the first component 300. The second pick-up device 3 is mounted on the base 1 and comprises two second gripping mechanisms 31 opposite to each other. The two second gripping mechanisms 31 are configured to pivot to and fro relative to each other, so as to grip the second component 400.

In an embodiment shown in FIGS. 2 and 3, the first component 300 is a housing with a larger size, for example, a few millimeters, or even a few centimeters or more, for an electrical connector. The second component 400 is a connection terminal with a smaller thickness, for example, below a few millimeters, for the electrical connector. The connection terminal may be at least partly mounted into the housing to form the electrical connector. In this way, the two first gripping mechanisms 21 may linearly move with respect to each other by a larger distance, so as to pick up the first component 300 with larger size. The second mechanisms 31 may rotate with respect to each other by a smaller distance, so as to pick up the second component 400 with smaller size. Thereby, in an embodiment, the automatic pick-up equipment 200 may pick up components with different shapes and sizes by different gripping ways, increasing the operational flexibility. In another embodiment, the moving distance of the first gripping mechanisms 21 may be adjustable to hold a first component 300 with different lengths or widths.

Figure 6:
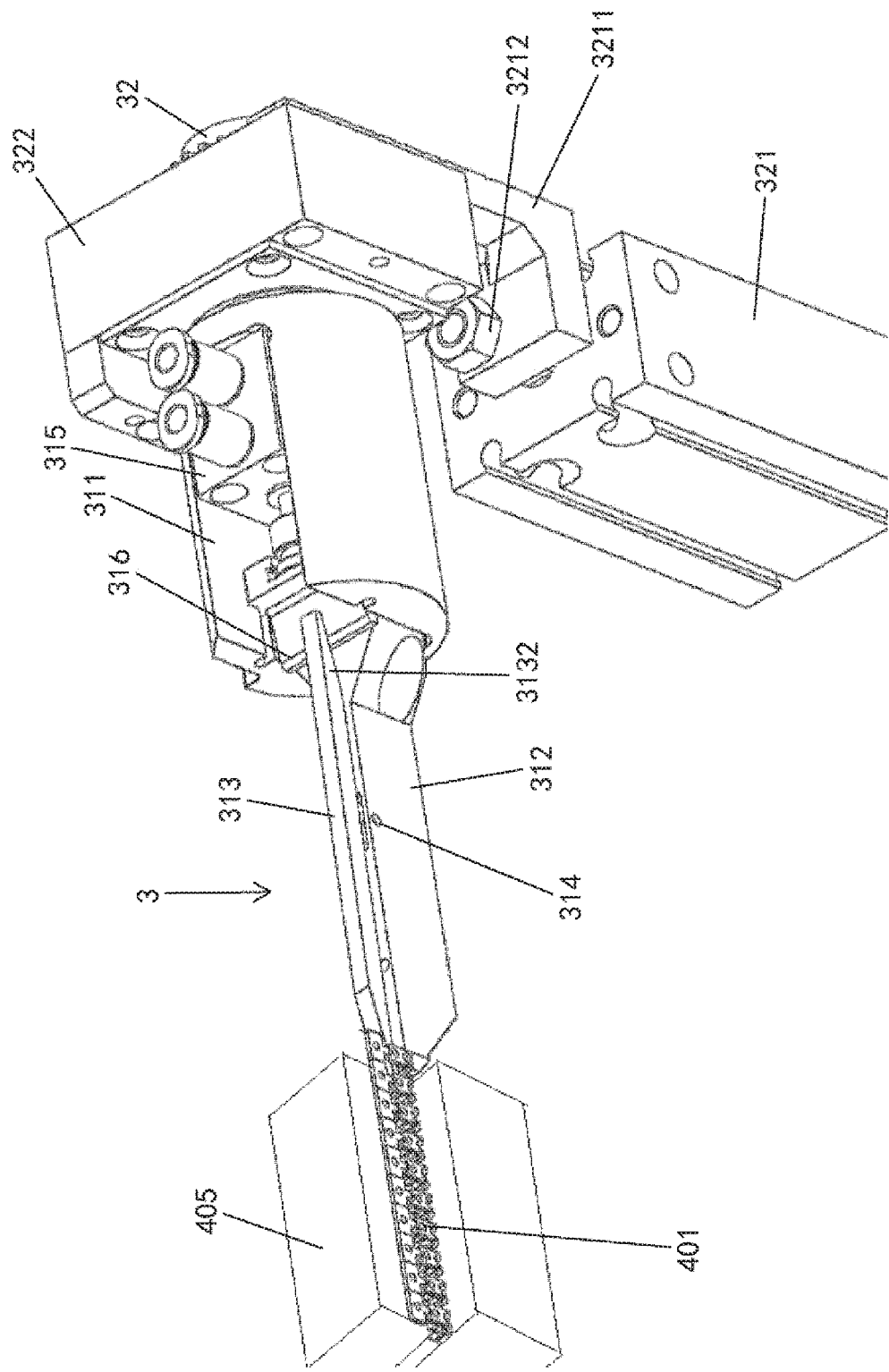
FIG. 6 is a perspective view of the second pick-up device with the second component.

In an embodiment, the second pick-up device 3 further comprises a rotation mechanism 32, shown in FIG. 6, configured to drive the two second gripping mechanisms 31 to rotate relative to the base 1, so as to change a posture of the second component 400, for example, for rotating or bending the second component 400.

As shown in FIGS. 1-4, the base 1 has a lower support frame 11 mounted on the manipulator 101 of the robot 100 and an upper support frame 12 supported on the lower support frame 11. The first pick-up device 2 is mounted on the upper support frame 12. In an embodiment, the first pick-up device 2 has a first driving device 221, 222 mounted between the upper support frame 12 and the lower support frame 11. The first gripping mechanisms 21 each include a movable block 211 passing through the upper support frame 12 on the base 1 and connected to the first driving device 221, 222, so that the movable block 211 is driven to linearly move, and a gripper 212 mounted on the movable block 211 and configured to cooperate with another gripper 212 to grip the first component 300 when the at least one of two movable blocks 211 moves toward each other.

The first driving device 221, 222, as shown in FIG. 4, includes a motor 221 and a screw rod 222. The screw rod 222 is connected to an output shaft of the motor 221. The screw rod 222 is thread engaged with a meshing part 213 of the movable block 211 extending between the upper support frame 12 and the lower support frame 11, so as to drive the movable block 211 to linearly move through the screw rod 222 and the meshing part 213 by the motor 221. In this way, the second gripping mechanism 21 may be opened or closed. Generally, the meshing part 213 has threads mated with the screw rod 222, so as to convert a rotation movement of the screw rod 222 into a straight line movement of the movable block 211. The motor 221 may comprise a step motor or a servo motor.

In an embodiment, at least one of the two first gripping mechanisms 21 has a first driving mechanism provided on the movable block 211 and configured to drive the gripper 212 to linearly move on the movable block 211, so as to grip the first component 300 by the gripper 212. For example, the first driving mechanism comprises a first pneumatic device configured to drive the gripper 212 to move relative to the movable block 211 by a gas pressure. Generally, the movable block 211 driven by the motor 221 has a larger moving distance. When the gripper 212 is driven by the movable block 211 to come into initial contact with the first component 300, the motor 221 is controlled to stop rotation. At this time, the opened distance of the gripper 212 may be accurately adjusted by using the first pneumatic device on the movable block 211 to drive the gripper 212 to move relative to the movable block 211, so that the gripper 212 may further firmly clamp the first component 300. Because the gripper 212 is driven to move by the gas pressure, it increases the flexibility of the first gripping mechanism 21, and may protect the first component 300 from being crushed. In an embodiment shown in FIG. 4, at least one gas source 4, provided at a lower portion of the lower support frame 11, is mounted on the base 1, so as to supply a pressurized gas for first pneumatic device. In another embodiment, the first driving mechanism may include an electromagnetic mechanism or a pneumatic device to drive the movable block 211 to move in a straight line. In another embodiment, the first driving mechanism may include a step motor or a servo motor.

In an embodiment, as shown in FIGS. 2-3 and 5-8, the second gripping mechanism 31 includes an installation portion 311, a fixation arm 312, a rotation arm 313 and a second driving device. The installation portion 311 is mounted on the base 1. The fixation arm 312 extends from the installation portion and is provided with a first contact surface 3121 on an end thereof. The rotation arm 313 is pivotally mounted on the fixation arm 312 and provided with a second contact surface 3131 on a first end thereof. The second driving device is mounted on the installation portion 311 and configured to drive the rotation arm 313 to rotate relative to the fixation arm 312, so as to grip the second component 400 by cooperation of the first contact surface 3121 and the second contact surface 3131. In an embodiment, the first contact surface 3121 and the second contact surface 3131 are parallel to each other in a case of gripping the second component 400, so as to reliably hold the second component 400.

As shown in FIGS. 5-8, the rotation arm 313 is mounted on the fixation arm 312 by a pivotal shaft 314 between the first end and a second end 3132 opposite to the first end. The second driving device includes a second driving mechanism 315 mounted on the installation portion 311 and a tongue portion 316 configured to be inserted between the fixation arm 312 and the second end 3132 of the rotation arm 313 under the drive of the second driving mechanism 315, so as to drive the rotation arm 313 to rotate relative to the fixation arm 312, and move the second contact surface 3131 on the first end of the rotation arm 313 toward the first contact surface 3121 to grip the second component 400. The second driving mechanism has a second pneumatic device configured to drive the tongue portion 316 to move by the gas pressure from the gas source 4. At least one slope structure is provided on the tongue portion 316 and/or the second end 3132 of the rotation arm 313, in order to smoothly insert the tongue portion 316 between the fixation arm 312 and the second end 3132 of the rotation arm 313. In another embodiment, the second driving mechanism 315 may include an electromagnetic mechanism to drive the tongue portion to move in a straight line. In another embodiment, the second driving mechanism 315 may comprise a motor, as well as a gear and a rack driven by the motor.

In an embodiment, the second gripping mechanism 31 includes an elastic reset mechanism provided between the fixation arm 312 and the rotation arm 313. The elastic reset mechanism elastically drives the second contact surface 3131 to move far away from the first contact surface 3121 in a case where the tongue portion 316 exits between the fixation arm 312 and the second end 3132 of the rotation arm 313. In this way, the elastic reset mechanism may keep the second contact surface 3131 and the first contact surface 3121 in a state far away from each other when it does not need to grip the second component 400, that is, the second gripping mechanism 31 is kept in an opened state for subsequent operation of gripping a next second component 400.

As shown in FIGS. 2-3 and 5-7, the rotation mechanism 32 includes a side support frame 321 mounted on a side of the base 1 and a third driving device mounted on the side support frame 321 and configured to drive the installation portion 311 of the second gripping mechanism 31 to rotate relative to the side support frame 321. The third driving device includes a fixation seat 322, a rotation shaft 323, and a third driving mechanism. The fixation seat 322 is mounted on the side support frame 321. The rotation shaft 323 is rotatably mounted on the fixation seat 322. The installation portion 311 of the second gripping mechanism 31 is mounted on the rotation shaft 323 to rotate with the rotation shaft 323, so as to drive the installation portion 311 to rotate relative to the fixation seat 322. The third driving mechanism is configured to drive the rotation shaft 323 to rotate.

Figure 5:
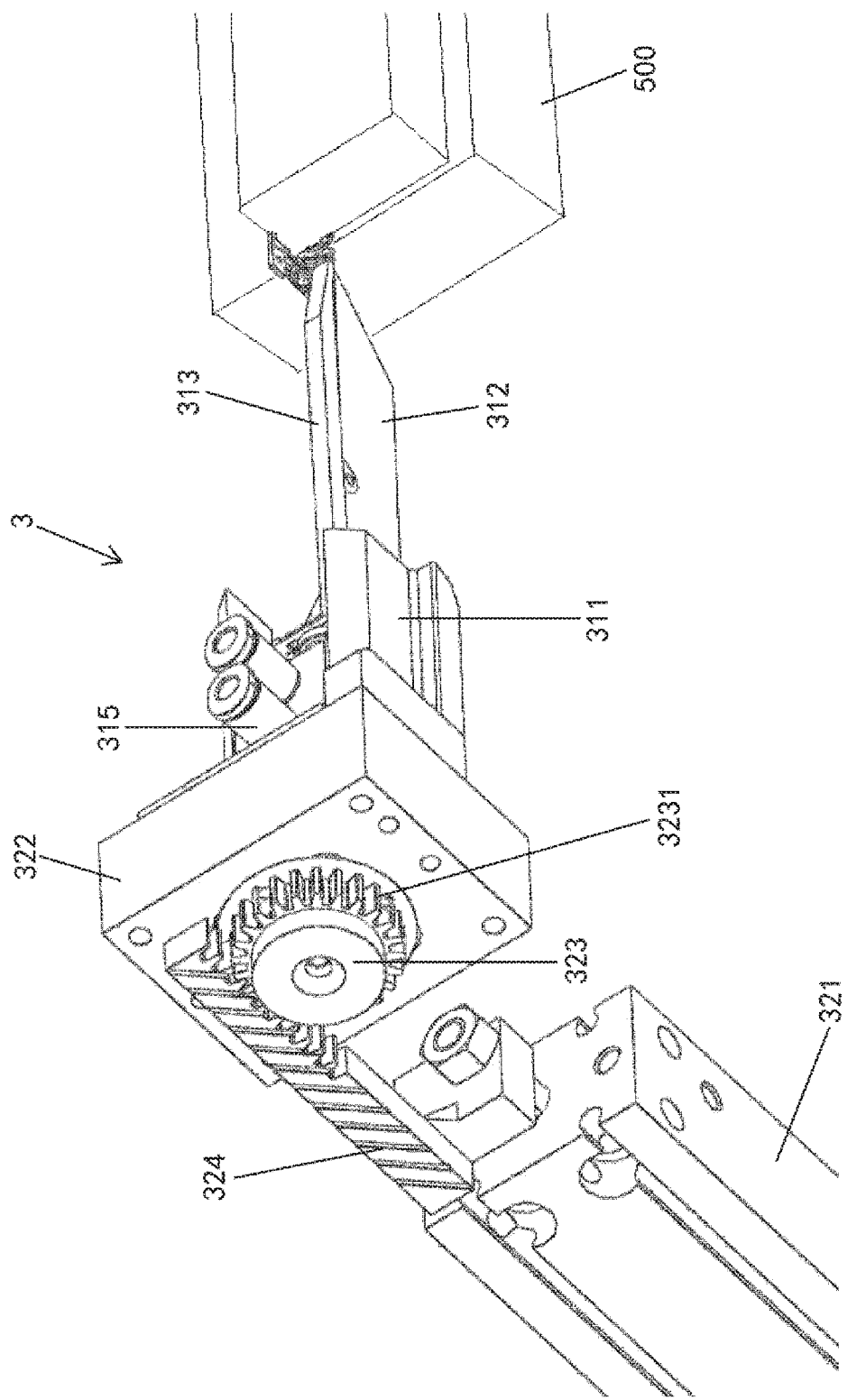
FIG. 5 is a perspective view of a second pick-up device of the automatic pick-up equipment.

As shown in FIGS. 5-6, a gear 3231 is provided on the rotation shaft 323. The third driving mechanism includes a rack 324 engaged with the gear 3231 and a third pneumatic device communicated with the gas source 4 and configured to drive the rack 324 to linearly move, so as to drive the gear 3231 to rotate by the rack 324. Thus, the linear movement of the third driving device is converted to the rotation of the rotation shaft 323. When a cylinder of the third pneumatic device expands and contracts, the rack 324 moves straight forward and back, thus driving the second gripping mechanism 31 to rotate clockwise and counterclockwise. In another embodiment, the third driving mechanism is a motor mounted in the installation portion 311, and the rotation shaft 323 may be driven to rotate by an output shaft of the motor. In an embodiment, the first, second and third pneumatic devices each may comprise a cylinder and a rod mounted on the cylinder.

In an embodiment, the fixation seat 322 is detachably mounted on the side support frame 321. For example, a connection frame 3211 is detachably installed on the side support frame 321 by bolts 3212, and the fixation seat 322 is mounted on the connection frame 3211. In order to clearly show the meshing mode of the rack 324 and the gear 3231, the connection frame 3211 is not shown in FIG. 5. The second gripping mechanism 21 and a part of the rotation mechanism may be removed, repaired or replaced depending on the type of the picked second component 400 or the use of the second gripping mechanism 21.

As shown in FIGS. 5-10, the first component 300 comprises a housing 301, the second component 400 comprises a connection terminal 401. In an embodiment of the present disclosure, the automatic pick-up equipment also may be used to assemble the connection terminal 401 to the housing 301 to form the electrical connector.

In an embodiment, the first pick-up device 2 is configured to fix the gripped housing 301 on an installation table (not shown), the second pick-up device 3 is further configured to insert the gripped connection terminal 401 into an installation hole 302 in the fixed housing 301.

Figure 8:
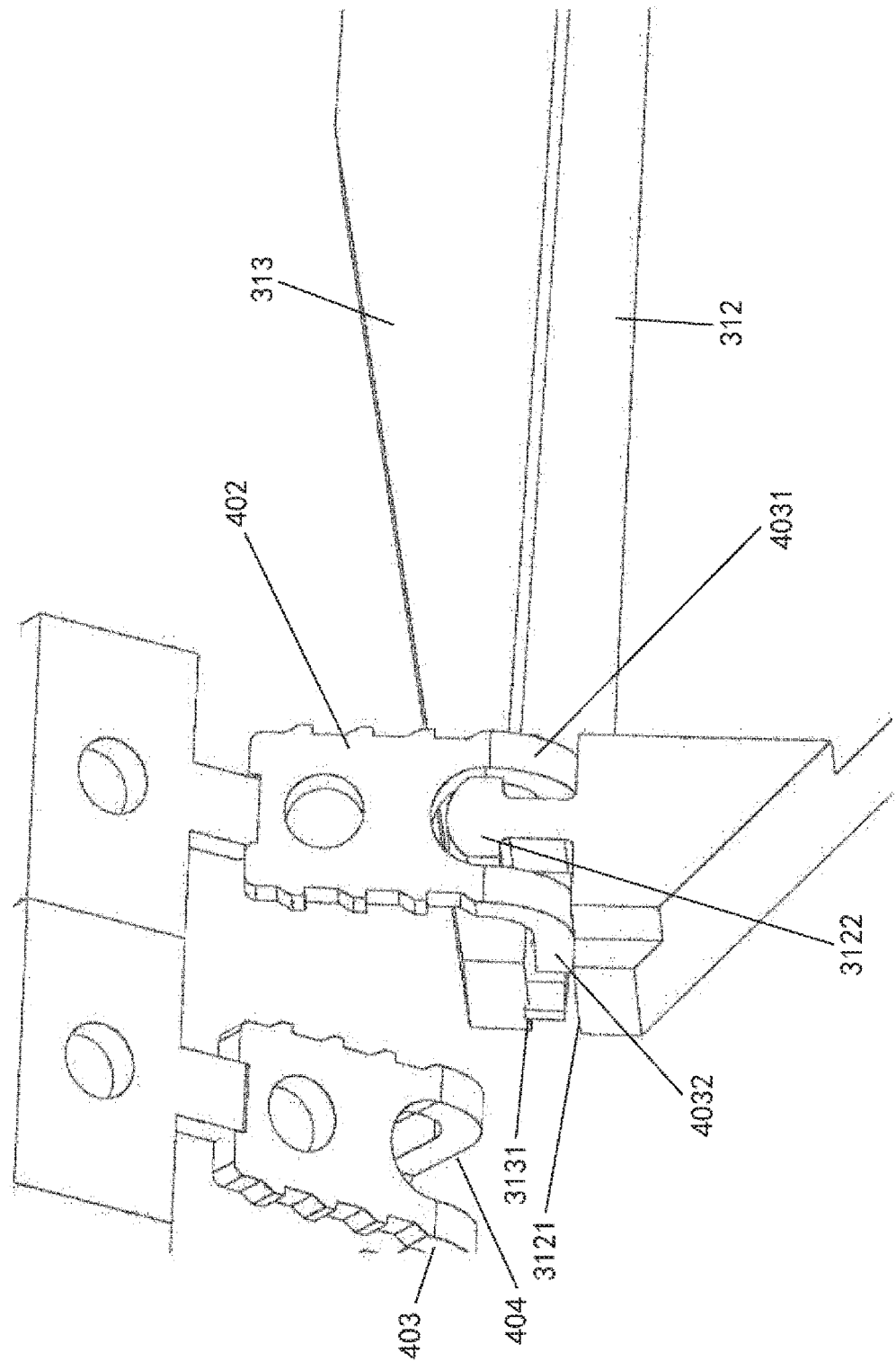
FIG. 8 is a perspective view of a portion A of FIG. 7.
Figure 9:
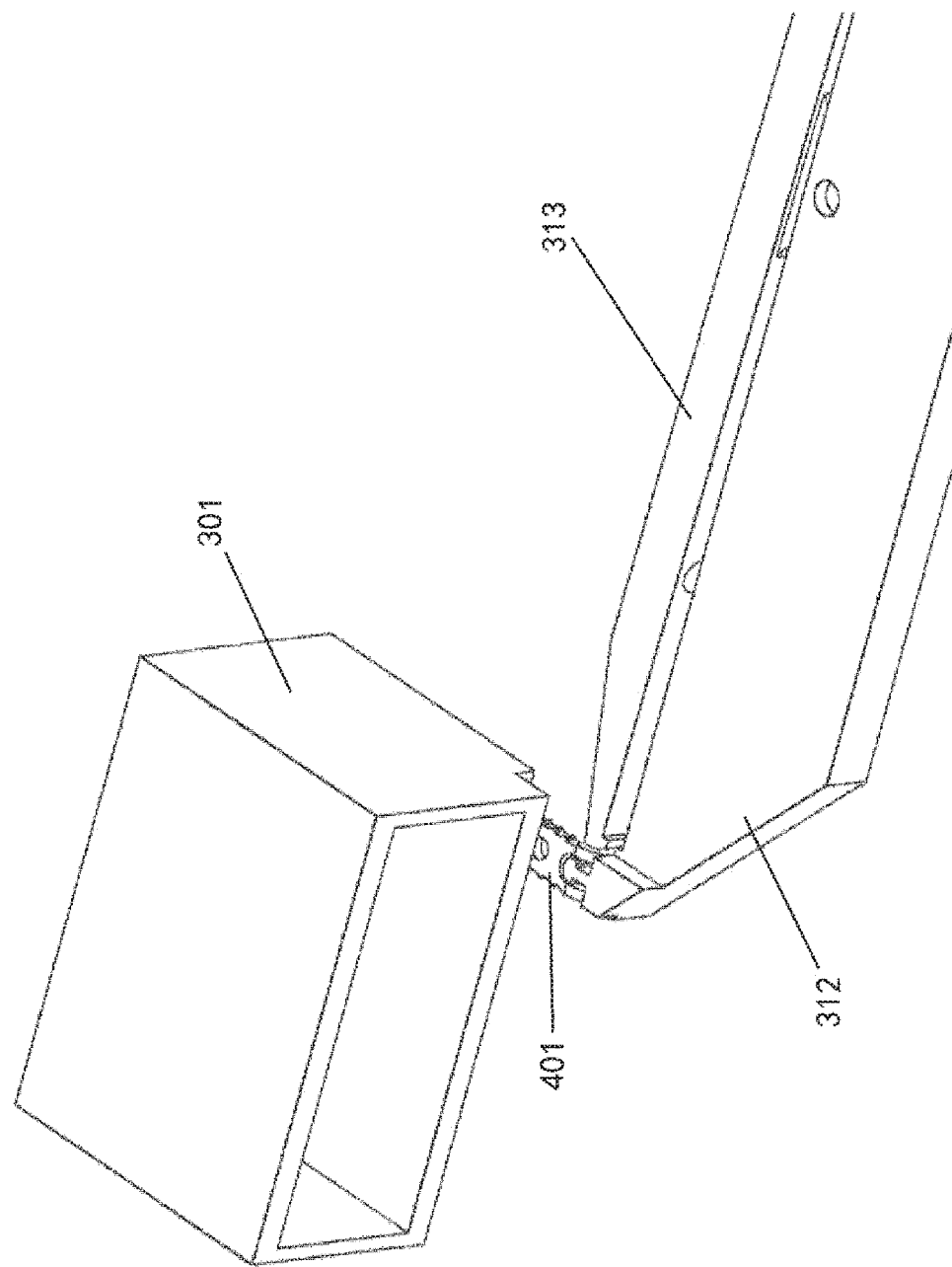
FIG. 9 is a perspective view of the second pick-up device with a housing of the first component and a connection terminal of the second component.

As shown in FIG. 8, the connection terminal 401 includes a main body 402 and two connection arms 403. The two connection arms 403 extend parallel from the main body 402. The two connection arms 403 each have a first part 4031 extending from the main body 402, and a second part 4032 substantially perpendicular to the first part 4031, so that the first parts 4031 of the two connection arms 403 and the main body 402 define a generally U-shaped opening 404. The second gripping mechanism 31 grips the second part 4032 of the connection terminal 401.

As shown in FIG. 8, a protrusion 3122 is provided on the end of the fixation arm 312, the protrusion 3122 protrudes in a direction approximately perpendicular to the first contact surface 3121, and the protrusion 3122 is configured to insert into the U-shaped opening 404 of the connection terminal 401, so as to push the connection terminal 401 into the installation hole 302 of the housing 301. In this way, an insertion force of the second gripping mechanism 31 to push the connection terminal 401 into the installation hole 302 of the housing 301 is exerted by the protrusion 3122, thus avoiding the soft connection terminal 401 from being deformed.

As shown in FIGS. 2-4 and 9-10, the first pick-up device 2 grips and picks up the housing 301, used as the first component, from a material storage table (not shown), and the gripped housing 301 is fixed to the installation table.

Figure 7:
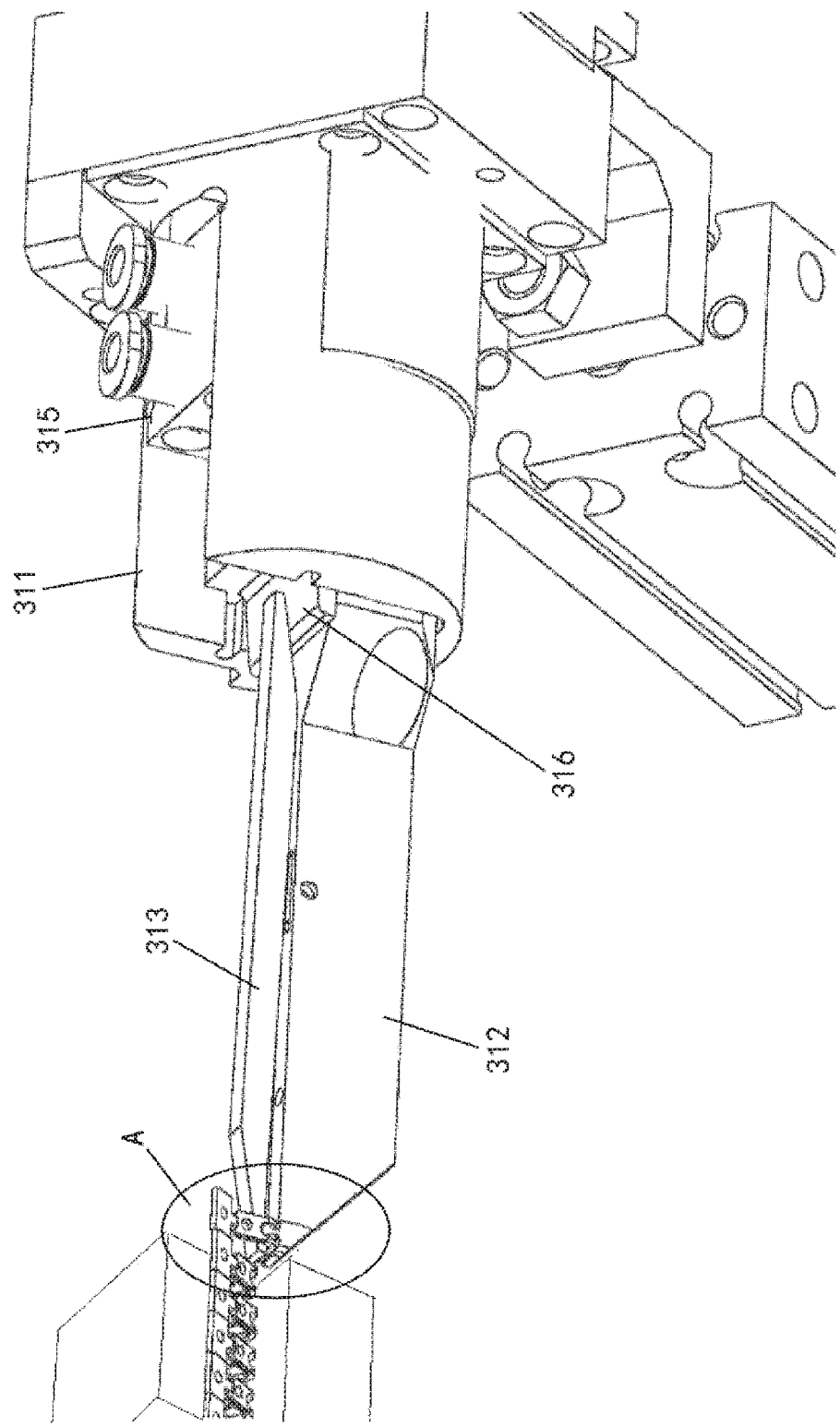
FIG. 7 is a perspective view of the second pick-up device.

As shown in FIGS. 6-8, a plurality of connection terminals 401 are prepositioned in rows on a storage bracket (for example, a material conveyer belt) 405. First, the robot 100 conveys the second pick-up device 3 to a proper position, the second gripping mechanism 31 grips the second part 4032 of the connection terminal 401 by the first contact surface 3121 and the second contact surface 3131, while the protrusion 3122 of the second gripping mechanism 31 is inserted into the U-shaped opening 404 of the connection terminal 401. Then, the third pneumatic device is started and the rotation mechanism 32 rotates the second gripping mechanism 31 by a predetermined angle so that the connection terminal 401 is detached from the storage bracket 405. Then, the robot 100 conveys the connection terminal 401 to a position where the housing 301 is located, the automatic pick-up equipment 200 starts to move, and the rotation mechanism 32 is controlled to rotate. In this way, the main body of the connection terminal 401 is pushed into the installation hole 302 of the housing 301 by the protrusion 3122, so as to form an assembled electrical connector.

In an exemplary embodiment, the robot 100 includes, but is not limited to, a four-axis robot, a six-axis robot or any other type of multi-freedom robot. These robots may rotate, move up and down or move to left and right according to a preprogrammed program, so as to move the automatic pick-up equipment 200 to an appropriate position and perform related operations.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An automatic pick-up equipment adapted to pick up components having different shapes, comprising:
   a base mounted on a manipulator of a robot;
   a first pick-up device mounted on the base and including:
      a pair of first gripping mechanisms each having a respective one of a first gripper and a second gripper arranged opposite to each other, the first gripping mechanisms are configured to linearly reciprocate relative to each other to grip a first component;
      a first driving device;
      a movable block on which the first gripper is mounted, the movable block connected to the first driving device for driving the movable block to move linearly relative to the second gripper; and
      a first driving mechanism arranged on the movable block and configured to drive the first gripper to move linearly relative to the second gripper for gripping the first component therebetween; and a second pick-up device mounted on the base and including a pair of gripping arms opposite to each other and a rotation mechanism, the gripping arms are configured to pivotally reciprocate relative to each other to grip a second component, the rotation mechanism is configured to drive the gripping arms to rotate relative to the base to change a posture of the second component.

2. The automatic pick-up equipment of claim 1, wherein the base includes a lower support frame mounted on the manipulator and an upper support frame supported on the lower support frame, the first pick-up device is mounted on the upper support frame.

3. The automatic pick-up equipment of claim 2, wherein the first driving device is mounted between the upper support frame and the lower support frame, the first gripping mechanisms each have a movable block passing through the upper support frame and connected to the first driving device so that the movable blocks are driven to linearly move, and the first and second grippers mounted on a respective one of the movable blocks and cooperating to grip the first component.

4. The automatic pick-up equipment of claim 3, wherein the first driving device includes a motor and a screw rod connected to an output shaft of the motor, the screw rod is engaged with a meshing part of each of the movable blocks extending between the upper support frame and the lower support frame, so as to drive the movable blocks to linearly move through the screw rod and the meshing parts with the motor.

5. The automatic pick-up equipment of claim 1, wherein the first driving mechanism has a first pneumatic device configured to drive the first gripper to move relative to the movable block by a gas pressure.

6. The automatic pick-up equipment of claim 1, wherein the second pick-up device includes an installation portion mounted on the base and a second driving device, the pair of gripping arms include a fixation arm extending from the installation portion and having a first contact surface on an end of the fixation arm, a rotation arm pivotally mounted on the fixation arm and having a second contact surface on a first end of the rotation arm, the second driving device mounted on the installation portion and configured to drive the rotation arm to rotate relative to the fixation arm so as to grip the second component by cooperation of the first contact surface and the second contact surface.

7. The automatic pick-up equipment of claim 6, wherein the first contact surface and the second contact surface are parallel to each other while gripping the second component.

8. The automatic pick-up equipment of claim 7, further comprising at least one gas source mounted on the base.

9. The automatic pick-up equipment of claim 6, wherein the rotation arm is mounted on the fixation arm by a pivotal shaft between the first end of the rotation arm and a second end of the rotation arm opposite to the first end.

10. The automatic pick-up equipment of claim 6, wherein the rotation mechanism includes a side support frame mounted on a side of the base and a third driving device mounted on the side support frame and configured to drive the installation portion to rotate.

11. The automatic pick-up equipment of claim 10, wherein the third driving device includes a fixation seat mounted on the side support frame, a rotation shaft rotatably mounted on the fixation seat, the installation portion being mounted on the rotation shaft to rotate with the rotation shaft, and a third driving mechanism configured to drive the rotation shaft to rotate.

12. The automatic pick-up equipment of claim 11, wherein the rotation shaft has a gear and the third driving mechanism has a rack engaged with the gear and a third pneumatic device configured to drive the rack to linearly move, so as to drive the gear to rotate by the rack.

13. The automatic pick-up equipment of claim 12, wherein the fixation seat is detachably mounted on the side support frame.

14. The automatic pick-up equipment of claim 6, wherein the first component has a housing and the second component has a connection terminal, the first pick-up device is configured to fix the housing on an installation table and the second pick-up device is configured to insert the connection terminal into an installation hole in the housing.

15. The automatic pick-up equipment of claim 14, wherein the connection terminal has a main body and a pair of connection arms extending parallel from the main body, the connection arms each have a first part extending from the main body and a second part substantially perpendicular to the first part, the first parts of the connection arms and the main body define a generally U-shaped opening, the second pick-up device gripping the second part of the connection terminal.

16. An automatic pick-up equipment adapted to pick up components having different shapes, comprising:
    a base mounted on a manipulator of a robot;
    a first pick-up device mounted on the base and including a pair of first gripping mechanisms opposite to each other, the first gripping mechanisms are configured to linearly reciprocate relative to each other to grip a first component; and
    a second pick-up device mounted on the base and including:
        a fixation arm having a first contact surface and a rotation arm pivotally mounted to the fixation arm between a first end and a second end of the rotation arm, and having a second contact surface, the fixation arm and the rotation arm arranged opposite to each other and configured to pivotally reciprocate relative to each other to grip a second component;
        a rotation mechanism configured to rotate the fixation arm and the rotation arm relative to the base to change a posture of the second component; and
        a driving device for rotating the rotation arm relative to the fixation arm so as to grip the second component by cooperation of the first contact surface and the second contact surface, the driving device including a driving mechanism and a tongue portion inserted between the fixation arm and the second end of the rotation arm under drive of the driving mechanism, so as to drive the rotation arm to rotate relative to the fixation arm and move the second contact surface toward the first contact surface.

17. The automatic pick-up equipment of claim 16, wherein the driving mechanism has a pneumatic device configured to drive the tongue portion to move by a gas pressure.

18. The automatic pick-up equipment of claim 16, further comprising an elastic reset mechanism between the fixation arm and the rotation arm, the elastic reset mechanism elastically drives the second contact surface to move away from the first contact surface when the tongue portion exits between the fixation arm and the second end of the rotation arm.

19. An automatic pick-up equipment adapted to pick up components having different shapes, comprising:
- a base mounted on a manipulator of a robot;
- a first pick-up device mounted on the base and including a pair of first gripping mechanisms opposite to each other, the first gripping mechanisms are configured to linearly reciprocate relative to each other to grip a first component; and
- a second pick-up device mounted on the base for gripping a second component and including:
  - a fixation arm having a first contact surface and a protrusion disposed on a first end thereof, the protrusion extending in a direction approximately perpendicular to the first contact surface and configured to be inserted into an opening of the second component to push the second component into an installation hole of the first component;
  - a rotation arm arranged opposite and pivotally mounted to the fixation arm between a first end and a second end of the rotation arm, and having a second contact surface;
  - a driving device for rotating the rotation arm relative to the fixation arm so as to grip the second component by cooperation of the first contact surface and the second contact surface; and
  - a rotation mechanism configured to rotate the fixation arm and the rotation arm relative to the base to change a posture of the second component.

* * * * *